Jan. 3, 1967 P. SCHRAMM 3,295,682

SEWAGE TREATMENT APPARATUS

Filed Sept. 10, 1964 4 Sheets-Sheet 1

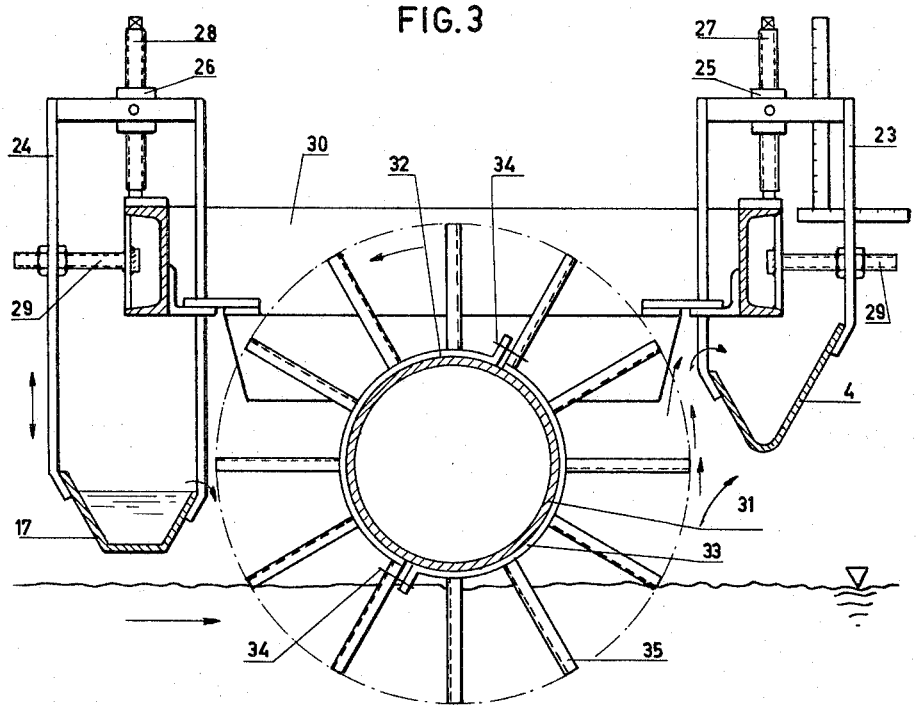
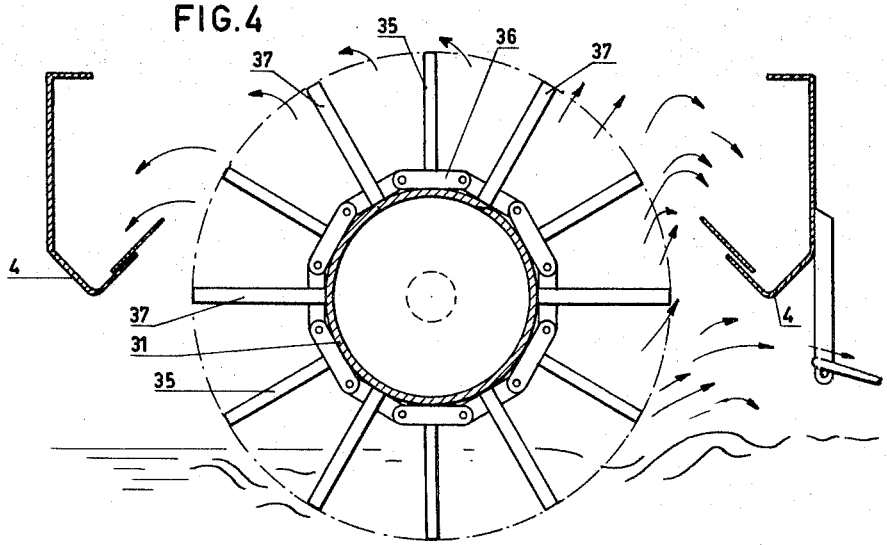

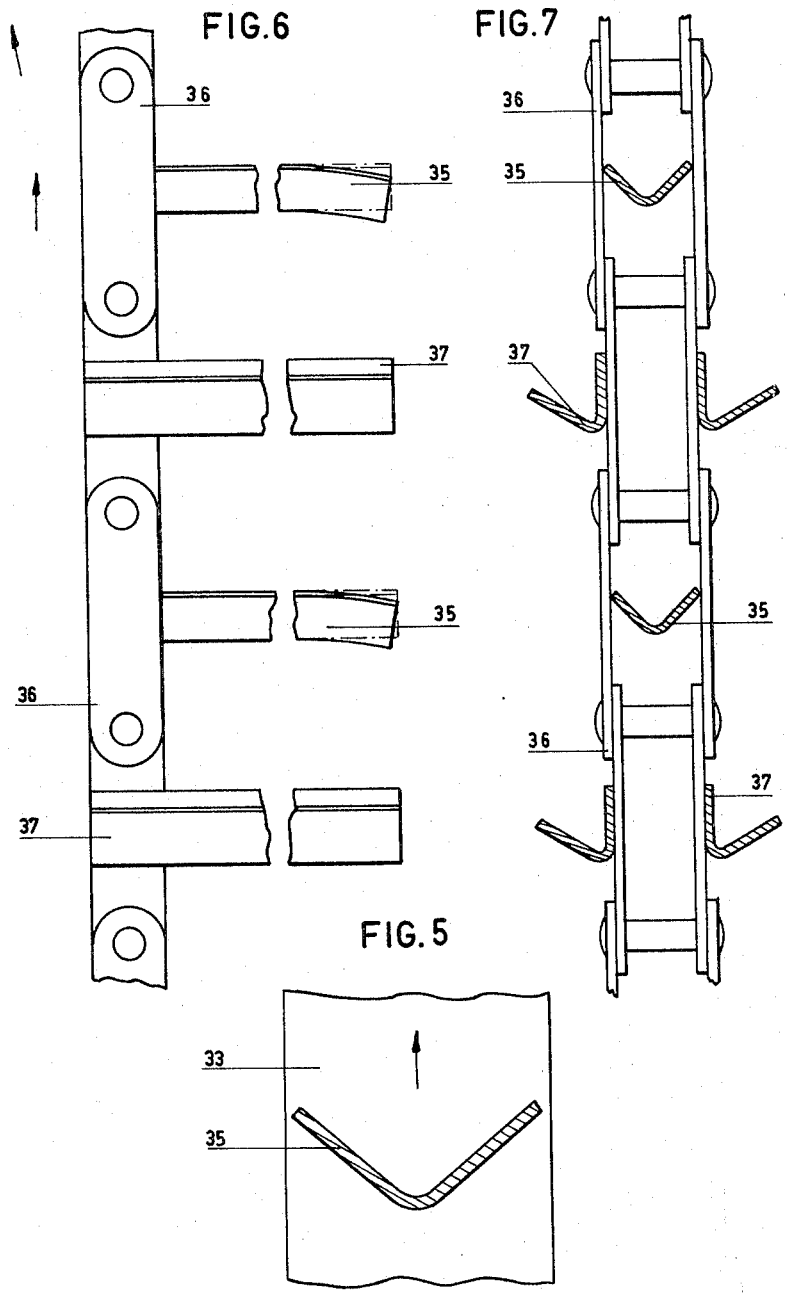

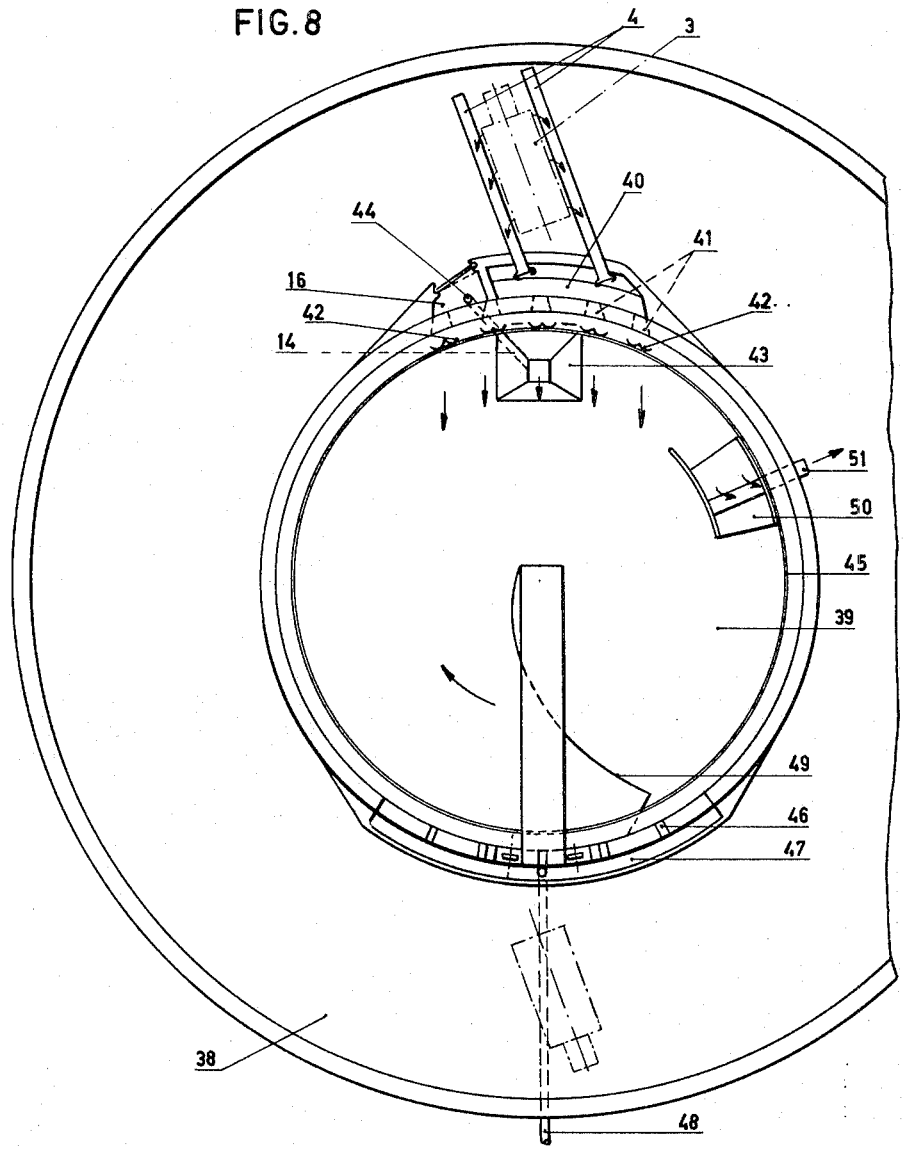

United States Patent Office 3,295,682
Patented Jan. 3, 1967

3,295,682
SEWAGE TREATMENT APPARATUS
Paul Schramm, Nassau, Germany, assignor to Nederlandse Organisatie voor Toegepast-Natuur-Wetenschappelijk Onderzoek ten Behoeve van de Volksgezondheid, The Hague, Netherlands, a corporation of the Netherlands
Filed Sept. 10, 1964, Ser. No. 396,481
Claims priority, application Germany, Sept. 10, 1963,
P 32,561
2 Claims. (Cl. 210—195)

This invention relates to improvements in a plant for the biological purification of sewage by means of the activated sludge process.

In general, such plants comprise an aeration reservoir or tank with an aeration rotor of the rotating brush type and a sedimentation tank from which activated sludge is returned to the aeration reservoir.

The aeration reservoir may be an oxidation and activated sludge ditch, an oxidation pool or the like.

Advantageously, the aeration rotor is of the kind described in U.S. Patent No. 3,109,875 to the same assignee, or of the type described below.

In the prior art devices, sedimentation tanks are known, in which the level of the liquid is lower than that in the aeration reservoir. The activated sludge from the sedimentation tank is in its entirety or partly returned to the aeration reservoir by means of pumps. The capacity of such pumps is constant, which entails the disadvantage that it is difficult to treat irregular amounts of influent and that, therefore, the pumps have to be used intermittently. In addition to this, the sewage to be treated frequently contains rubbish, which may cause technical trouble in the pumps, even if hose-wheel pumps or the like are used; for often sewage is not subjected to a pretreatment.

It is known in the art to solve this problem by applying a paddle-wheel instead of pumps. Such a paddle-wheel raises the energy costs of the plant. Further it has been proposed to provide for the transmission of sludge to the sedimentation tank and for the return of it to the aeration reservoir without specific auxiliary means, such as pumps and the like; however, only by mounting the supply and recycle conduits with a minimum of slope before and behind the aeration rotor, respectively, so that the current velocity of the liquid is employed to obtain the required result. A drawback of this method is that only the liquid velocity at a specific location can be employed, which velocity is reduced in the supply conduit to such an extent that a difference in level of 50 to 300 millimeters cannot be obtained: whilst, particularly when wave forming occurs in the aeration tank, the difference between both levels may be reduced to zero. Further disadvantages of this method are, on the one side, that the sand and the like in the sludge may cause disturbances and, on the other side, the recycling has too low a capacity to obtain the return of 100 to 400 percent of activated sludge, which is required to achieve a dry substance content of 4 to 8 grams per litre in the purified effluent.

The object of the invention is to provide an improved device in which the disadvantages stated above are overcome.

Another object of the invention is to provide an improved purification plant of the type described, in which the motion, to which the sewage is subjected in order to achieve the required degree of oxygen introduction, as well as the movement required to treat the whole of the sewage in the plant, is employed to raise the liquid and supply it to a sedimentation tank having a higher liquid level, without having to spend additional energy; only by using a simple and relatively cheap modified construction.

Other objects of the invention will appear from the description below.

My improvement comprises a plant of the type indicated above, wherein at least one trough or the like is mounted above the liquid level of the sedimentation tank in such a way that sewage as well as activated sludge is supplied to it by the aeration rotor and is transferred by it to the sedimentation tank.

Advantageously, the sedimentation tank is provided with a discharge conduit which returns part of the activated sludge to the suction side of the aeration rotor by means of level height differences, whereby a recycling is achieved without employing pumps. Thus, my invention makes use of the turbulence and the flow of the sewage liquid, which is required for the effective introduction of oxygen and the smooth course of the biological purification process in this type of purification plant.

The invention is illustrated by the drawings, in which—

FIG. 3 shows an embodiment of an aeration rotor and of adjustable troughs by means of a cross-section along the line III—III of FIG. 1;

FIG. 4 shows a similar cross-section through another embodiment of the aeration rotor;

FIGS. 5–7 show a detail of the rotor of FIG. 4; and

FIG. 8 shows a plant for the biological sewage treatment with an annular container.

Figure 1:
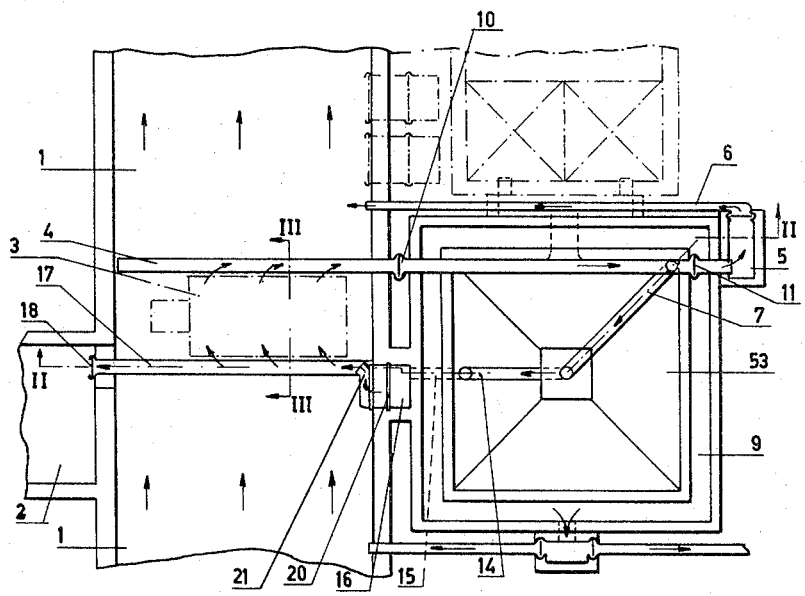
FIG. 1 shows a schematical and partial upper view of the main parts of an embodiment of the improved sewage treatment plant.
Figure 2:
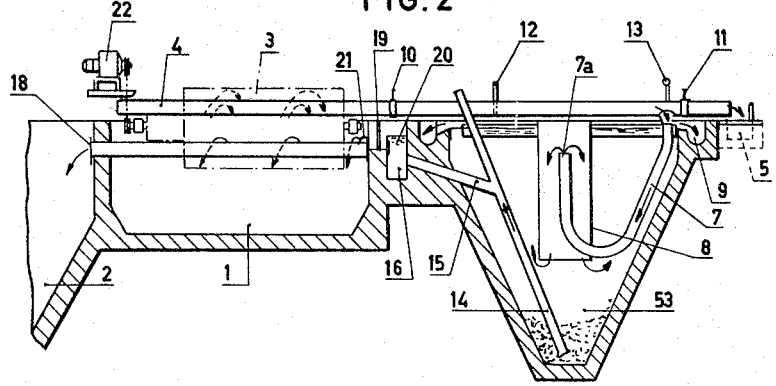
FIG. 2 shows a cross-section along the line II—II of FIG. 1.

The embodiment of FIGS. 1 and 2 shows an oblong aeration channel 1, which is part of an annular aeration reservoir. A sludge deposit container 2 for excess sludge is constructed at the left side and a sedimentation tank 53 at the right side of the aeration channel 1. Over the aeration channel 1 are situated the bearings of the aeration rotor 3, which is driven by a motor 22 with reduction gear and the aeration elements of which dip into the liquid. Before the aeration rotor is situated the highly mounted collecting trough 4 for the collection of the sewage liquid which is splashed up by the aeration rotor, as is shown more in detail in FIG. 3. This trough 4 leads to a receiver or measuring container 5, from which a discharge gutter or tube 6 returns to the aeration channel 1, and a U-shaped tube 7 leads into the sedimentation tank 53. The discharge end 7a of this tube is surrounded by a dipping tube 8; so that the liquid and the activated sludge transmitted by the trough 4 enters the tank 53 through the underside of said tube 8. The water freed from the activated sludge flows into the gutter 9 and can then be discharged from the plant.

The trough 4 further comprises the slides 10 and 11, a graduated measuring scale 12 and at the entrance of tube 7 a screw plug 13. These serve to control the amounts of liquid flowing to tube 7 and to the measuring container 5.

The activated sludge deposit in the sedimentation tank 53 can be discharged via a conduit 14. This conduit shows a side conduit 15, which leads into a receiver 16. From here, the sludge can enter a trough 17, situated lower than the collecting trough 4, and flow into the aeration channel 1 at the suction side of the aeration rotor, as is shown in FIG. 3. By means of the slides 18 and 21, part of the activated sludge can be allowed to enter the sludge deposit sump 2. Receiver 16 can be constructed as measuring chamber. To this end, it is provided with a graduated scale 19 and with the slides 20 and 21. Therefore, besides the cycle of the sewage in the aeration channel, the plant shows a self-acting sludge cycle which leads from the channel 1, by the trough 4, through the sedimentation tank 53, and returns through conduits 14, 15, chamber 16 and return trough 17 into the aeration channel 1.

As shown in FIG. 3, both the troughs 4 and 17 are adjustable as to height. They are suspended in frames 23 and 24 respectively, which frames are provided with nuts 25 and 26, which in turn can be adjusted as to height by means of the spindles 27 and 28. The spindles 29 are mounted in horizontal direction for adjusting the frames 23 and 24. They are mounted fixedly to the frame construction 30 and fixed to frames 23 and 24 by means of nuts and a guiding groove (not shown).

The aeration rotor and the frame construction 30 can be constructed as a bridge spanning the channel 1. The embodiment of the aeration rotor 3 of FIG. 3 comprises a hollow cylindrical shaft 31 mounted in bearings and having a number of shoulders adjusted around it, each shoulder being composed of two parts, 32 and 33, and being fixed on the hollow shaft by means of bolts 34. Each of the shoulders bears radial aeration bars 35, which, as shown in FIG. 5, may be shaped as shovel elements. The parts 33 to 35 form an aeration star clamped to the hollow shaft. The number of aeration stars which are clamped to the hollow shaft is chosen according to the oxygen introduction required in any given plant. If the oxygen requirement of the plant increases, the oxygen introducing capacity of such an aeration rotor can be increased by mounting further aeration stars on the shaft 31.

In the embodiment of the aeration rotor shown in FIG. 4, a link chain 36 spans the shaft 31, which chain is constructed from separate chain members which are flexibly linked by rivets.

A spanner, which is not shown in the figure, stretches the chain around the shaft 31 in a manner known in the art. As shown in FIGS. 6 and 7 every other link bears an aeration bar 35 between the link sides, and the links in between bear, at their outsides, aeration bars and shovel elements 37 which latter have a sharp angle.

As is shown in FIG. 6, the aeration elements 37 and 35 may be straight or somewhat bent and closed at the outer ends.

FIG. 8 shows a circular plant for the biological purification of sewage. The aeration channel 38 is annular and the sedimentation tank 39 circular. The shaft of the aeration rotor 3 with two splash troughs 4 is situated horizontally and is in an inclined position with regard to the radial direction as defined by the radius of the circular plant. Preferably, the angle between the axis of the aeration rotor and the said radial direction is 30 degrees.

Before the sedimentation tank 39 is situated a collecting container 40, with openings 41, through which the liquid enters the tank 39, where it is spread by baffle plates 42. The sedimentation tank is provided with a sludge sump 43, from which the conduit 14 leads to a receiver 16, which leads into the aeration container 38 via an opening controllable by a slide 44. The treated liquid runs below a dip mantle 45 over a brim 46 into the discharge gutter 47 and further to the discharge 48. Further, the sedimentation tank 39 of FIG. 8 is provided with a mechanical shovel 49 with a kind of scraper for removing any sludge deposit into the sump 43. Moreover, the sedimentation tank is provided with a collecting box 50 for collecting floating sludge and discharging it through conduit 51.

As indicated in the drawing a second aeration rotor may be mounted in the annular aeration channel. It is to be noted that the aeration rotor should be driven with a rotational speed, which is in the optimal oxygen introducing capacity range for the particular rotor used, and which provides the sewage at its base with an adequate current velocity, which preferably amounts to about 0.29 to 0.34 meter per second. This is to prevent the settling of sludge at the bottom of the aeration tank. Advantageously, a peripheral rotor speed of about 2.5 to 3.8 meters per second is applied in order to splash up substantial amounts of sewage liquid.

I claim:
1. A sewage treatment apparatus comprising an aeration tank provided with a sewage inlet, and a sewage outlet maintaining a predetermined liquid level therein, and with at least one aeration rotor of the rotating brush type provided with aeration elements, which rotor is rotatably mounted on a horizontal axis situated over the liquid level in the aeration tank with said aeration elements dipping below said liquid level during rotation of said rotor and means for rotating the said rotor; a sedimentation tank for the aftertreatment of the sewage treated in the aeration tank, said sedimentation tank including means maintaining a predetermined liquid level therein and being situated in such a manner that during the operation of the apparatus the liquid level in the sedimentation tank is higher than that in the aeration tank; means for conveying treated sewage from the aeration tank into the sedimentation tank, which means comprise at least one trough which is mounted alongside of said rotor so as to collect sewage liquid splashed up by said aeration elements of said rotor; and means for returning activated sludge from the sedimentation tank to the aeration tank.

2. A sewage treatment apparatus as claimed in claim 1 wherein the means for returning said sludge from the sedimentation tank to the aeration tank comprises a conduit ending at one end adjacent the bottom of the sedimentation tank and at the other end in a trough situated at the suction side of said aeration rotor at a level below the liquid level of the sedimentation tank during operation so that the return sludge is conveyed to the aeration tank by hydrostatic pressure, said conduit further comprising means for adjusting the flow of liquid through it.

References Cited by the Examiner

UNITED STATES PATENTS

| | | | |
|---|---|---|---|
| 978,889 | 12/1910 | Imhoff | 210—151 X |
| 1,642,206 | 9/1927 | Imhoff | 210—197 |
| 1,820,976 | 9/1931 | Imhoff | 210—195 |
| 1,976,228 | 10/1934 | Hutzel | 261—92 |
| 2,684,941 | 7/1954 | Pasveer | 210—209 |
| 2,901,114 | 8/1959 | Smith et al. | 210—256 X |
| 3,109,875 | 11/1963 | Schramm et al. | 261—92 X |

REUBEN FRIEDMAN, *Primary Examiner.*

J. L. DECESARE, *Assistant Examiner.*